United States Patent

Lerich

[15] 3,703,119
[45] Nov. 21, 1972

[54] EXPANSION BOLT
[72] Inventor: Lester Lerich, 1120 Birdie Place, Broomfield, Colo. 80020
[22] Filed: Sept. 14, 1970
[21] Appl. No.: 72,087

Related U.S. Application Data

[62] Division of Ser. No. 543,857, April 20, 1966, abandoned.

[52] U.S. Cl. ............................85/67, 85/79, 85/87
[51] Int. Cl. ...............................................F16b 13/06
[58] Field of Search............85/67, 69, 63, 73, 74, 75, 85/76, 79, 85, 86, 87, 88; 287/124

[56] References Cited

UNITED STATES PATENTS

| 1,407,570 | 2/1922 | Peirce | 85/64 |
| 1,420,532 | 6/1922 | Edwards | 85/87 |
| 2,207,008 | 7/1940 | Hocher | 287/124 |
| 3,277,770 | 10/1966 | McCullock | 85/87 |

FOREIGN PATENTS OR APPLICATIONS

| 515,448 | 12/1939 | Great Britain | 85/67 |
| 1,008,863 | 11/1965 | Great Britain | 85/79 |
| 75,361 | 5/1961 | France | 85/79 |
| 1,305,740 | 8/1962 | France | 85/79 |
| 1,163,277 | 2/1964 | Germany | 85/86 |

Primary Examiner—Marion Parsons, Jr.
Attorney—Reilly and Lewis

[57] ABSTRACT

An expansion bolt of the type provided with collar-like wedge members disposed in an annular recess on the external surface of the bolt shank which are automatically movable into anchoring engagement with the wall of the bolt hole under the urging of a resilient insert extending transversely through the bolt shank behind the wedges in further cooperation with outwardly directed projections on the wedge members.

5 Claims, 8 Drawing Figures

PATENTED NOV 21 1972 3,703,119
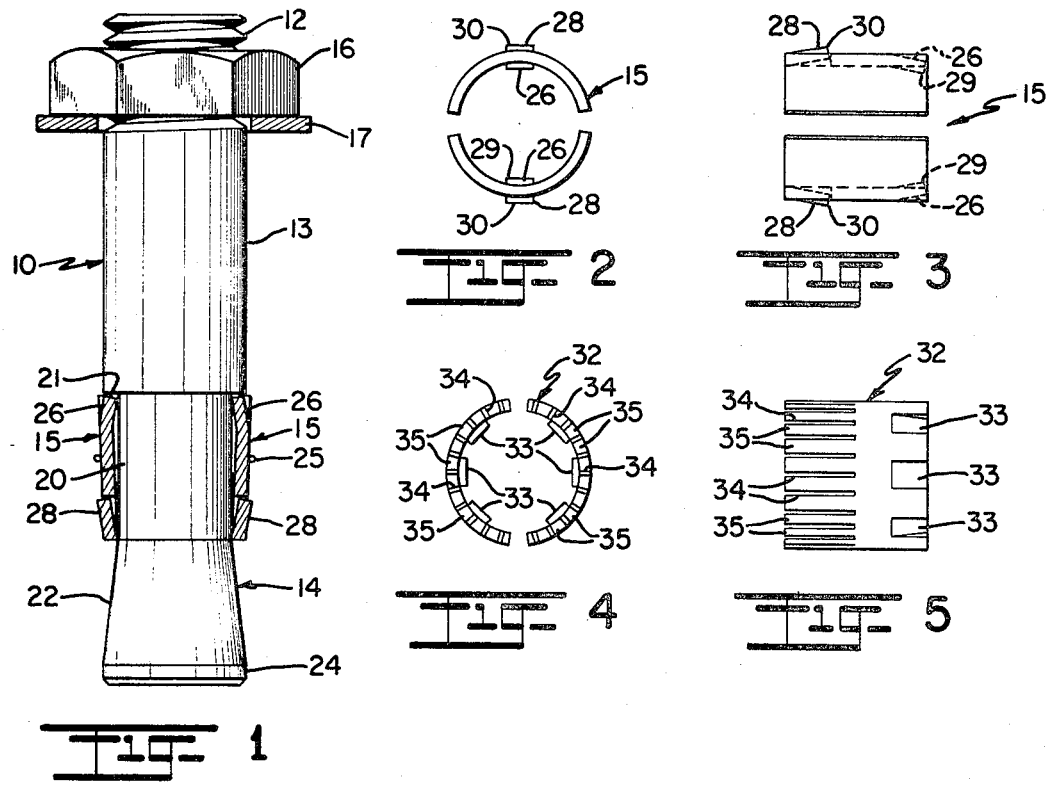
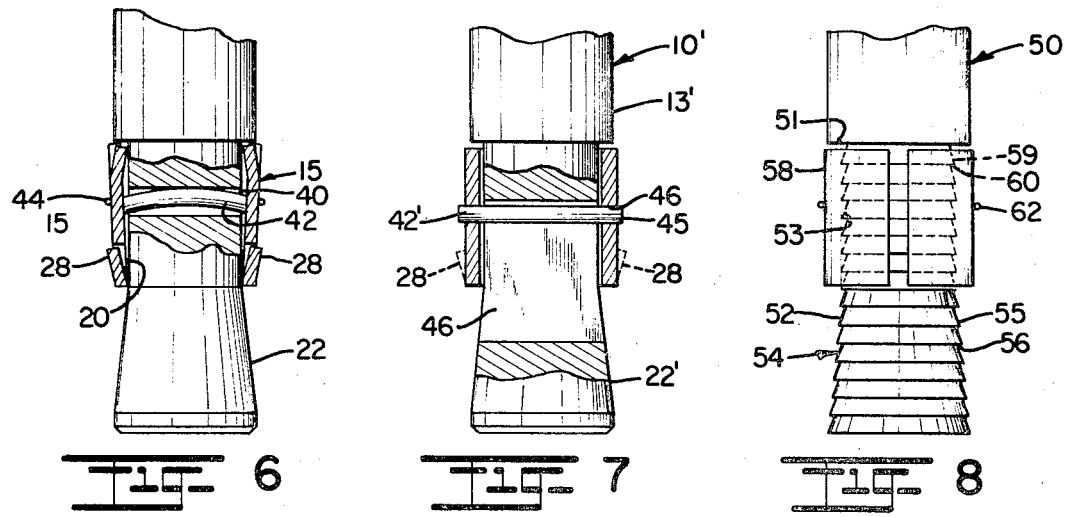
INVENTOR.
LESTER LERICH
BY
John E Reilly
ATTORNEY

EXPANSION BOLT

This is a division of application Ser. No. 543,857, filed Apr. 20, 1966, now abandoned.

This invention generally related to anchoring devices, and more particularly relates to a novel and improved self-anchoring bolt being adaptable for use in various applications to facilitate anchoring or fastening an object to a wall or other structure capable of having a bolt hole formed therein, the anchor bolt according to the present invention being especially designed for self-anchoring in a blind hole.

It is customary in the fastener art to employ anchoring devices, commonly referred to as anchor or expansion bolts, which upon insertion into a hole are capable of self-anchoring against outward displacement. Anchoring is usually accomplished by applying an outward pull or tension on the bolt in which direction anchoring or wedge elements associated with the bolt are free to expand into wedging engagement with the wall of the hole; and the same may be accomplished by utilizing in cooperation with the wedging elements some form of actuating member which upon insertion into the hole can either be manipulated or automatically will urge the wedges into anchored relation. Generally, it is important that the wedge elements be rapidly movable into positive anchored relation with a minimum of outward displacement of the bolt, and that the wedge elements be anchored over the broadest possible surface area of engagement with the wall of the hole so as to minimize shifting or accidental release of the bolt.

It is therefore an object of the present invention to provide for a novel and improved anchoring device of the type described and which is characterized by being highly simplified and requiring a minimum number of parts; and further, wherein wedging elements have been devised which are so constructed and arranged as to be capable of rapid movement into anchored relation within a hole either under the urging of separate actuating means or in direct response to outward displacement of the bolt member from a hole.

Another object of the present invention is to provide for novel and improved forms of wedging elements characterized by being useable either with or without wedge actuating means to establish positive anchoring in a blind hole over a broad surface area of engagement and in a highly effective and dependable manner.

It is further an object of the present invention to provide for wedge actuating means in an anchoring device which is capable in cooperation with one or more wedging elements automatically to cause positive gripping action between the wedging elements and the wall of a hole and to accomplish the same without requiring manipulation of the bolt or actuating means externally of the hole.

It is an additional object of the present invention to provide a highly simplified form of wedge elements which have specially formed gripping fingers or lugs to facilitate movement into anchored relation within a hole and whereby, by virtue of the simplified construction and arrangement of the lug-type wedging elements may be effectively utilized in cooperation with various types of anchor bolts with or without the use of auxiliary wedge actuating means.

The above and other objects, advantages and features of the present invention will become more readily appreciated and understood from a consideration of the following detailed description when taken together with the accompanying drawings, in which:

FIG. 1 is a view partially in section of one embodiment of the anchor bolt in accordance with the present invention.

FIG. 2 is an end view of the wedge element employed in the embodiment shown in FIG. 1.

FIG. 3 is a side view of the wedge element shown in FIG. 2.

FIG. 4 is an end view of an alternate form of wedging member adapted for use with an anchor bolt of the type shown in FIG. 1.

FIG. 5 is a side view of the wedge members shown in FIG. 4.

FIG. 6 is a fragmentary view of an alternate form of anchoring device in accordance with the present invention.

FIG. 7 is a fragmentary view partially in section of another modified form of anchoring device; and FIG. 8 is a fragmentary view of still another modified form of anchoring device.

Referring in detail to the drawings, there is shown in FIGS. 1 to 3 one embodiment of the present invention which takes the form of an anchor bolt 10 having an external threaded end 12, an elongated cylindrical shank 13, generally circular in cross-section, and the shank includes a wedge-receiving circumferential groove or recess 14 adjacent to the forward, leading end thereof for disposition of wedge members 15. Generally the entire assembly is adapted for insertion in a bore or opening formed in a building wall or other structure for the purpose of securing an object thereto. This is done specifically by means of a nut 16 and washer 17 placed on the threaded end portion 12 and which upon tightening will operate to withdraw the bolt member slightly from the hole so as to expand the wedges outwardly into positive gripping engagement with the surrounding surface of the bore, all in a manner to be hereinafter described in more detail.

Considering in more detail the bolt construction shown in FIGS. 1 to 3, it will be seen that the recess 14 is formed out of the external surface of the shank relatively near the leading end and in such a way as to define a reduced circumferential bearing surface portion 20 of uniform diameter terminating in a shoulder 21 at its intersection with the external surface of the shank; also, a forwardly divergent bearing surface 22 forms a continuation of the inner bearing surface 20 to terminate in a leading extremity 24 which has a diameter preferably corresponding to that of the major diameter of the shank.

The bolt and specifically the shank construction as described permits utilization of the wedging members 15, each wedge being semi-circular in cross-section and of a uniform thickness approximating the depth of the recess along the reduced bearing surface 20. Further, the wedges are most desirably of a length corresponding to the longitudinal extent of the reduced bearing surface portion 20, as best seen from FIG. 1. It will be further noted that each wedge member 15 includes an inwardly directed projection of a lug 26 at its trailing end which is bent or otherwise shaped out of the body of the wedge to incline inwardly and somewhat rearwardly for engagement with the external surface of the reduced surface portion 20. Moreover, the leading end of each wedge at a point in line with the projection 26 has an outwardly directed projection or lug 28 of limited extent and which is similarly bent or otherwise shaped out of the body thickness of the wedge to include somewhat rearwardly but outwardly for gripping engagement with the surrounding wall surface of the opening. In this relation, the projections 26 and 28 are each formed with relatively sharp corners or extremities 29 and 30, respectively, to establish frictional engagement with the external bearing surface 20 and wall surface of the opening.

In use, preferably the anchor bolt 10 is dimensioned to approximate the diameter of the hole or opening so that at all times there will be contact between the wedge members, particularly the outer projections 28, and the wall surface of the hole. Thus upon insertion inwardly through the opening, the rearwardly inclining projections 28 will yieldingly engage the surrounding wall surface of the hole, and as a result the wedge members 15 are merely held or retained along the inner reduced surface portion 20 and against the shoulders 21. However, when inserted to the desired depth in the hole and upon tightening the bolt, such as, by inward threading of the nut 16 along the threaded end 12, the shank will be withdrawn or displaced in a rearward direction relative to the opening and to the wedge members 15, since the wedges 15 are held in stationary relation by frictional engagement between the lugs 28 and the wall surface. Accordingly, the wedges 15 are free to slide forwardly along the inclined bearing surface 22, as the shank is displaced rearwardly, with the lugs 28 being forced into positive gripping engagement with the wall surface. It is to be particularly noted that, once the direction of movement of the bolt member with respect to the hole is reversed in the direction of withdrawal as described, the rearward and somewhat outwardly inclined attitude of the lugs 28 will cause rapid outward expansion of the wedges 15 into positive anchored engagement with the wall. At the same time, the inwardly directed lugs 26 will maintain the trailing ends of the wedge members 15 in outer spaced relation to the bearing surface 20 so as to protrude slightly beyond the external surface of the shank; also, the lugs 26 will engage the bearing surface 20 in a direction tending to prevent any slipping therebetween, since the sharp corners 29 will tend to seize the external surface 20, once the wedge members are expanded into anchored relation, to prevent rearward sliding movement of the wedges with respect to the shank.

In the form of invention shown in FIGS. 4 and 5, a pair of semi-circular wedge members 32 is illustrated, each having a series of inwardly bent projections or lugs 33 inclining rearwardly at spaced circumferential intervals about the trailing end. In turn, the forward or leading end of the wedge is slotted at closely spaced, circumferential intervals to define a series of longitudinally split wall portions 35. This form of wedge collar arrangement may be utilized in the form of invention shown in FIG. 1; and in use, it will be seen that the inwardly directed lugs 33 serve to enlarge the trailing ends of the wedge members outwardly beyond the periphery of the shank to establish initial engagement between the wedge members and the wall surface. Thus, upon withdrawal or tightening of the bolt member the wedge members are displaced along the divergent bearing surface 22 causing the split wall portions 35 to spread and to increase the effective diameter of the bolt until firm wedging engagement is established with the surrounding wall of the hole.

Another modified form of anchoring device is shown in FIG. 6 in which like parts are correspondingly enumerated to those illustrated in FIGS. 1 to 3. In the modified form, the recessed portion of the shank 13 is provided with a transverse bore 40 at a point approximately midway along the reduced bearing surface portion 20, and the bore is dimensioned to loosely receive an insert defined by a pin 42 composed of flexible or resilient material, such as, Nylon for extension transversely between the inner surfaces of the wedge members 15. In assembly the pin 42 is passed through the bore with opposite ends of the insert bearing against the inner surfaces of the wedge members for the purpose of encouraging initial spreading of the wedge members into contacting relation with the wall of the opening. In use, the wedges are normally held inwardly against the surface 20 with the pin 42 being held in compression therebetween by positioning a retaining ring 44 around the external surfaces of the wedges, as illustrated in FIG. 6. Upon insertion to the desired depth in a hole the insert will exert some outward pressure on the wedges urging the leading ends outwardly against the surrounding wall surface and effectively to preset the wedge members. Nevertheless, it is advisable to withdraw or tighten the bolt member in order to advance the wedges along the inclined surface 22 and to force the outwardly projecting lugs 28 into positive anchored relation to the wall surface. Under any degree of sliding movement and expansion of the wedges along the inclined bearing surface 22 the retaining ring 44 is sufficiently weak that it can easily be broken to permit increased expansion of the wedges under the urging of the pin 42.

In the form of invention shown in FIG. 7, the recessed portion of the shank is provided with a transverse slot 46 adapted to receive a modified form of insert 42'. The insert 42' is again in the form of a pin composed of a flexible or resilient material and which is dimensioned to project outwardly at opposite ends 45 through transverse openings 46 formed in the wedge members 15'. In this form, the wedge members 15' are provided with outwardly projecting lugs 28' at the leading ends and in diametrically opposed relation to one another; and the insert 42' serves the dual function of retaining the wedge members in place against the reduced surface portion 20 for insertion through a bolt hole while being of the necessary length to establish frictional engagement between the opposite ends 45 and the surrounding wall surface. In this way, once the bolt has been inserted into a hole to the desired depth and upon tightening thereof, the pin 42' is free to slide forwardly through the transverse slot 46 so as to displace the wedge members forwardly along the inclined bearing surface 22' while the wedge members are free to slide outwardly along opposite ends 45 into firm wedging engagement with the surrounding wall of the opening. In some cases, it may be desirable to eliminate the lugs 28' and to rely entirely on the pin 42' for forward displacement of the wedges into anchored relation, although the lugs 28' will afford more positive anchoring.

FIG. 8 illustrates another modified form of anchor bolt assembly having a bolt shank 50 in which the leading end thereof is undercut as at 52 again to define a reduced bearing surface 53 and forwardly divergent surface portion 54. However, the bearing surfaces 53 and 54 are of a ratchet tooth configuration having a series of circumferentially extending forwardly divergent inclined surfaces 55, separated by notches 56, along the length of the bearing surfaces. A pair of semi-circular wedge members 58 are positioned on the bearing surfaces as shown, and the inner surface of each wedge member is correspondingly formed to be complementary to the bearing surfaces and therefore is formed with inwardly directed, inclined surfaces 59 and notches 60 complementary to the surface portions 55 and notches 56 on the bearing surfaces. The wedge members are assembled over the bearing surface 53 in a position with the trailing ends of the wedges abutting the undercut portion 52, and a retainer band 62 is placed over the wedges to hold them securely in place for insertion into the hole. Upon tightening the bolt member, the wedges are free to slide in a forward direction along the bearing surfaces 53 and 54 whereupon the complementary ratchet teeth between the wedges and the bearing surfaces will undergo relative sliding movement and will cam the wedges outwardly into anchored relation against the wall of the opening. Once anchored, the complementary ratchet teeth on the shank will prevent any retraction or inward slipping of the wedges in a direction toward the inner reduced surface portion 53 thereby effectively locking the wedge members into place.

It will be apparent that the ratchet type construction may in the alternative be of helical or spiral form along the bearing surfaces 53 and 54 at the leading end of the shank to accomplish the same purpose, and of course the inner surfaces of the wedge members would be formed to be complementary to the ratchet threading on the shank. Moreover, in the various different forms of invention as set forth and described herein, the inner reduced surface 53 may be of uniform diameter as shown, or may be tapered in a forward direction away from the undercut shoulder portions formed at the intersection with the forwardly divergent bearing surface. However, the uniform diameter along the inner reduced bearing surface is preferred in that it enables more gradual transition into the divergent end so as to facilitate forward displacement of the wedge members into anchored engagement. In construction, the different forms of bolt assemblies or anchoring devices as described herein may be suitably formed, for example, in a casting or forging operation out of a hardened metal such as steel. In this relation it may be desirable to form the shank portion of a somewhat softer metal than the wedge member so that under sufficient pressure the inwardly directed lugs 26 will dig into the surface of the shank and prevent any slipping once anchored in place.

Moreover, the wedge members are most desirably composed of a material possessed of limited resiliency or flexibility to facilitate formation of the lugs out of the thickness of the material as well as to permit some yield or give by the lugs during insertion of the bolt assembly into a hole. Here the use of lugs which will bear firmly against the surrounding wall and against the external surface of the shank materially increases the pull out strength and torsional resistance of the bolt once anchored.

While there is herein set forth and described preferred and alternate forms of anchoring devices, it is to be understood that various modification and changes may be made in the construction and arrangement of parts, and that certain features of the present invention may be used without others without departing from the spirit and scope of the present invention as defined by the appended claims.

What is claimed is:

1. In an anchor bolt having an elongated cylindrical shank adapted for insertion in a bolt hole and being of a diameter corresponding to that of the hole and said shank being further provided with a wedge-receiving, circumferential recess adjacent to the leading end thereof with a forwardly divergent bearing surface portion, the combination therewith of an expansible collar comprising a pair of semi-circular wedge members disposed in the recess and arranged for forward slidable movement along the divergent bearing surface portion, said shank including a transverse opening extending across the recessed portion, and a resilient insert extending through the slot with opposite ends of said insert passing outwardly through apertures in said wedge members for engagement with the wall of the hole, each of said wedge members including a rearwardly and outwardly inclined lug formed out of the body thickness of said wedge member to establish frictional engagement with the wall of the hole whereby rearward displacement of said shank within the hole causes forward displacement and expansion of said wedge members along the forwardly divergent bearing surface portion into anchored relation to the wall of the bore.

2. An anchoring device according to claim 1, the transverse opening being in the form of a slot extending lengthwise of the recessed portion to permit sliding movement of said insert along the slot for forward displacement of said wedge members into anchored relation with the wall of the hole.

3. In an anchor bolt according to claim 1, each of said wedge members further including an inwardly and rearwardly inclined lug at the trailing end thereof, and said rearwardly and outwardly inclined lugs being disposed at the leading ends of said wedge members.

4. An anchoring device adapted to be inserted in a hole comprising an anchor bolt including an elongated cylindrical shank of a diameter corresponding substantially to that of the hole and provided with a wedge-receiving, circumferential recess having a rearward bearing surface portion of uniform diameter extending between an undercut shoulder portion and forwardly divergent bearing surface portion, said shank including a transverse slot extending lengthwise of the recessed portion of said shank, an expansible collar being defined by a pair of semi-circular wedge members being disposed on the rearward bearing surface portion, said wedge members being of a length not greater than that of the rearward bearing surface portion and of a thickness substantially corresponding to the depth of the recess along the rearward bearing surface portion, and a resilient pin extending transversely through the slot with opposite ends of said pin passing outwardly through openings in said wedge members for yielding frictional engagement with the wall of the hole, and being operative to expand said wedge members into engagement with the wall of the hole whereupon rearward displacement of said shank within the hole causes forward displacement of said wedge members along the forwardly divergent bearing surface portion into anchored relation with the wall of the hole.

5. An anchoring device according to claim 4, said wedge expansion means being defined by a solid resilient pin of rubber or rubber-like material extending through the opening with opposite ends of said pin bearing against the inner surfaces of said wedge members, said pin being compressed and flexed inwardly within the opening during insertion of said shank into the hole and being operative to yieldingly urge said wedge members outwardly against the wall of the hole whereupon displacement of said shank in a rearward direction said wedge members are movable forwardly along the divergent bearing surface into anchored engagement with the wall of the hole.

* * * * *